US012516686B2

(12) United States Patent
Pinedo et al.

(10) Patent No.: US 12,516,686 B2
(45) Date of Patent: Jan. 6, 2026

(54) DUAL-PARALLEL ACTUATOR PISTON INTERFACE

(71) Applicant: Woodward, Inc., Fort Collins, CO (US)

(72) Inventors: Jorge A. Pinedo, Fort Collins, CO (US); Justin E. Hans, Fort Collins, CO (US); Kevin M. Orloske, Fort Collins, CO (US)

(73) Assignee: Woodward, Inc., Fort Collins, CO (US)

( * ) Notice: Subject to any disclaimer, the term of this patent is extended or adjusted under 35 U.S.C. 154(b) by 0 days.

(21) Appl. No.: 18/214,133

(22) Filed: Jun. 26, 2023

(65) Prior Publication Data

US 2024/0426326 A1 Dec. 26, 2024

(51) Int. Cl.
*F15B 15/14* (2006.01)
*F16J 7/00* (2006.01)
(Continued)

(52) U.S. Cl.
CPC ...... *F15B 15/1457* (2013.01); *F15B 15/1433* (2013.01); *F15B 15/1447* (2013.01);
(Continued)

(58) Field of Classification Search
CPC .............. F15B 15/1447; F15B 15/1433; F15B 15/1404; F15B 18/00; F15B 15/1457;
(Continued)

(56) References Cited

U.S. PATENT DOCUMENTS 1,581,255 A * 4/1926 Watts ......................... F16J 7/00 92/172
2,956,549 A * 10/1960 Malpass .............. F15B 11/0365 92/152
(Continued)

FOREIGN PATENT DOCUMENTS

CN 104564897 4/2015
CN 108032997 5/2018
(Continued)

OTHER PUBLICATIONS

International Search Report and Written Opinion in International Appln. No. PCT/US2024/035597, mailed on Sep. 9, 2024, 15 pages.

*Primary Examiner* — Dustin T Nguyen
(74) *Attorney, Agent, or Firm* — Fish & Richardson P.C.

(57) ABSTRACT

The subject matter of this specification can be embodied in, among other things, an apparatus that includes a first assembly having a first piston rod having a first rod end, a second assembly arranged substantially parallel to the first piston assembly and having a second piston rod having a second rod end, an end assembly defining a first aperture configured to receive the first rod end, and a second aperture configured to receive the second rod end, a first retaining cap configured to affix to the first rod end, abut the end assembly when affixed to the first rod end, and retain the first rod end within the first aperture, and a second retaining cap configured to affix to the second rod end, abut the end assembly when affixed to the second rod end, and retain the second rod end within the second aperture.

18 Claims, 5 Drawing Sheets

(51) Int. Cl.
*F15B 15/28* (2006.01)
*F15B 18/00* (2006.01)

(52) U.S. Cl.
CPC ............. *F16J 7/00* (2013.01); *F15B 15/1404* (2013.01); *F15B 15/2861* (2013.01); *F15B 15/2892* (2013.01); *F15B 18/00* (2013.01); *F15B 2211/7107* (2013.01)

(58) Field of Classification Search
CPC .............. F15B 15/2861; F15B 15/2892; F15B 2211/7107; F16J 7/00
See application file for complete search history.

(56) References Cited

U.S. PATENT DOCUMENTS 3,147,671 A 9/1964 Geyer
3,240,124 A 3/1966 Howard et al.
3,342,396 A * 9/1967 Miller ..................... F15B 11/06 228/32
3,738,232 A * 6/1973 Kado ....................... F16J 10/02 403/11
3,884,127 A * 5/1975 Simmons ................ B64C 13/42 91/509
4,021,181 A * 5/1977 Hehl ................... B29C 45/1747 425/451.2
4,531,448 A 7/1985 Barnes
4,671,169 A 6/1987 Hillier
4,964,779 A 10/1990 Sagaser
6,474,598 B2 * 11/2002 Carter, Jr. ............... F16F 9/535 244/104 FP
6,588,313 B2 7/2003 Brown et al.
6,745,666 B2 6/2004 Zilioli
7,093,361 B2 8/2006 Richard
7,162,947 B2 1/2007 Kucher et al.
7,290,476 B1 11/2007 Glasson
7,395,749 B2 * 7/2008 Adams .................. F15B 15/227 91/395
9,550,228 B2 * 1/2017 Wilcox .................. B21J 15/022
10,316,868 B2 * 6/2019 Asaba ................. F15B 15/1457
10,337,581 B2 7/2019 Fox et al.
10,472,200 B2 * 11/2019 Re .......................... B65H 16/04
10,578,134 B2 * 3/2020 Takeda ................ F15B 15/1471
10,612,568 B2 * 4/2020 Giannakopoulos .......................... F15B 15/1447
11,261,885 B2 * 3/2022 Takakuwa ............. F15B 15/204
2005/0081710 A1 4/2005 Albright et al.
2007/0139041 A1 6/2007 Steinich
2008/0017024 A1 * 1/2008 Ruble ................... F02F 3/0084 92/172
2010/0307233 A1 12/2010 Glasson et al.
2014/0305299 A1 10/2014 Vanderveen et al.
2016/0238410 A1 8/2016 Steinich
2021/0317850 A1 10/2021 Takakuwa et al.
2024/0344535 A1 * 10/2024 Asano ................. F15B 15/1457

FOREIGN PATENT DOCUMENTS

CN 109236796 1/2019
CN 114030596 2/2022
EP 1942281 4/2017

* cited by examiner

DUAL-PARALLEL ACTUATOR PISTON INTERFACE

TECHNICAL FIELD

This instant specification relates to fluid actuators, more specifically dual-parallel fluid actuators.

BACKGROUND

Fly-by-wire actuation systems are becoming more common in the aircraft industry and require position-sensing capability. Some packaging arrangements use linear variable displacement transformers (LVDT) as position sensors, and the LVDTs are arranged within a hollow piston body. Adjustment and/or calibration of an installed LVDT require an ability to access the LVDT from the exposed end of the piston in order to allow an operator to access and adjust the installed LVDT after assembly. However, the features to enable access to the LVDT can weaken the piston end joint, compromising the joint's ability to withstand severe bending moments that may be developed in dual-parallel piston architectures.

SUMMARY

In general, this document describes a dual-parallel fluid actuator apparatus.

In a general example, an actuator apparatus includes a first piston assembly having a first piston rod having a first piston rod end, a second piston assembly arranged substantially parallel to the first piston assembly and having a second piston rod having a second piston rod end, an end assembly defining a first aperture configured to receive the first piston rod end, and a second aperture configured to receive the second piston rod end, a first retaining cap assembly configured to affix to the first piston rod end, abut the end assembly when affixed to the first piston rod end, and retain the first piston rod end within the first aperture, and a second retaining cap assembly configured to affix to the second piston rod end, abut the end assembly when affixed to the second piston rod end, and retain the second piston rod end within the second aperture.

Various embodiments can include some, all, or none of the following features. The end assembly can include a first shoulder extending radially partly inward from a first inner surface of the end assembly and partly defining the first aperture and partly defining a third aperture arranged coaxially within the first aperture, where the first piston rod end can be arranged to partly extend through the third aperture. The actuator apparatus can include a collar extending radially away from an outer surface of the first piston rod proximal the first piston rod end, and the end assembly includes an end face configured to coaxially contact the collar. The actuator apparatus can include a circumferential recess defined in the outer surface, and the collar can include a retaining clip partly arranged within the circumferential recess. The first piston rod end can include a first thread defined upon a first outer surface of the first piston rod, and the first retaining cap assembly can include a second thread defined upon a first inner surface of the first retaining cap, where the first thread can be configured to threadedly engage with the second thread. The actuator apparatus can include a longitudinal piston rod recess defined in an outer surface of the first piston rod, a longitudinal end assembly recess defined in the first aperture, and an anti-rotation key arranged at least partly within the longitudinal piston rod recess and at least partly within the longitudinal end assembly recess. The first retaining cap assembly can define an opening therethrough, and can include a removable plug arranged to occlude the opening. The first piston rod defines a first longitudinal cavity having a first opening at the first piston rod end, the second piston rod can define a second longitudinal cavity having a second opening at the second piston rod end, or both. The end assembly can include a mounting assembly or a clevis assembly.

In another general example, a method of assembling an actuator includes inserting a first piston rod end of a first piston assembly into a first aperture defined in an end assembly, removably affixing a first retaining cap assembly to the first piston rod end, and removably retaining, by the affixing, the first piston assembly to the end assembly.

Various implementations can include some, all, or none of the following features. The method can include inserting a second piston rod end of a second piston assembly into a second aperture defined in the end assembly, wherein the second piston assembly can be arranged substantially parallel to the first piston assembly, removably affixing a second retaining cap assembly to the second piston rod end, and removably retaining, by the affixing, the second piston assembly to the end assembly. Inserting the first piston rod end of the first piston assembly into the first aperture defined in the end assembly can include inserting the first piston rod end of the first piston assembly through a second aperture arranged coaxially within the first aperture, where the end assembly can include a shoulder extending radially partly inward from an inner surface of the end assembly and partly defining the first aperture and partly defining the second aperture. The method can include contacting an end face of the end assembly with a collar extending radially away from an outer surface of the first piston assembly proximal the first piston rod end. The collar can include a retaining clip, and the method can include arranging the retaining clip at least partly within a recess defined in the outer surface. Removably affixing the first retaining cap assembly to the first piston rod end can include threading the first retaining cap assembly onto the first piston rod end, where the first piston rod end can include a first thread defined upon a first outer surface of the first piston assembly, and the first retaining cap assembly can include a second thread defined upon a first inner surface of the first retaining cap, where the first thread can be configured to threadedly engage with the second thread. The method can include inserting an anti-rotation key into a cavity partly defined by a longitudinal piston rod recess defined in an outer surface of the first piston assembly and a longitudinal end assembly recess defined in the first aperture. The method can include removably affixing a plug to the first retaining cap assembly to occlude an opening defined though the first retaining cap assembly. The method can include accessing a first longitudinal cavity defined in the first piston assembly and having a first opening at the first piston rod end.

In another general example, an actuator apparatus includes a piston assembly having a piston rod having a piston rod end, an end assembly defining an aperture configured to receive the piston rod end, and a retaining cap assembly configured to affix to the piston rod end, abut the end assembly when affixed to the piston rod end, and retain the piston rod end within the aperture.

Various embodiments can include some, all, or none of the following features. The end assembly can include one or more of a shoulder extending radially partly inward from an inner surface of the end assembly and partly defining the aperture and partly defining a second aperture arranged coaxially within the aperture, where the piston rod end can be arranged to partly extend through the second aperture, a collar extending radially away from an outer surface of the piston rod proximal the piston rod end, and the end assembly can include an end face configured to coaxially contact the collar, and a first longitudinal cavity defined by the piston rod and having a first opening at the piston rod end.

The systems and techniques described here may provide one or more of the following advantages. First, a system can provide a high level of fatigue strength under the action of piston bending moments. Second, the system allows access to internal cavities for position sensor adjustment.

The details of one or more implementations are set forth in the accompanying drawings and the description below. Other features and advantages will be apparent from the description and drawings, and from the claims.

DETAILED DESCRIPTION

This document describes a dual-parallel fluid actuator piston interface apparatus. The apparatus includes a structure and arrangement of features that can provide access to a cavity within each piston (e.g., to access a linear variable displacement transformer, or LVDT, arranged within the cavity) without substantially compromising the ability of the apparatus to withstand severe bending moments that can be caused by asynchronous movements of dual-parallel pistons. In general, the piston rods are removably coupled to a rod end by trapping a portion of the rod end between the piston rod and a threaded retaining cap that is threaded onto a matingly threaded end of the piston rod.

Figure 1:
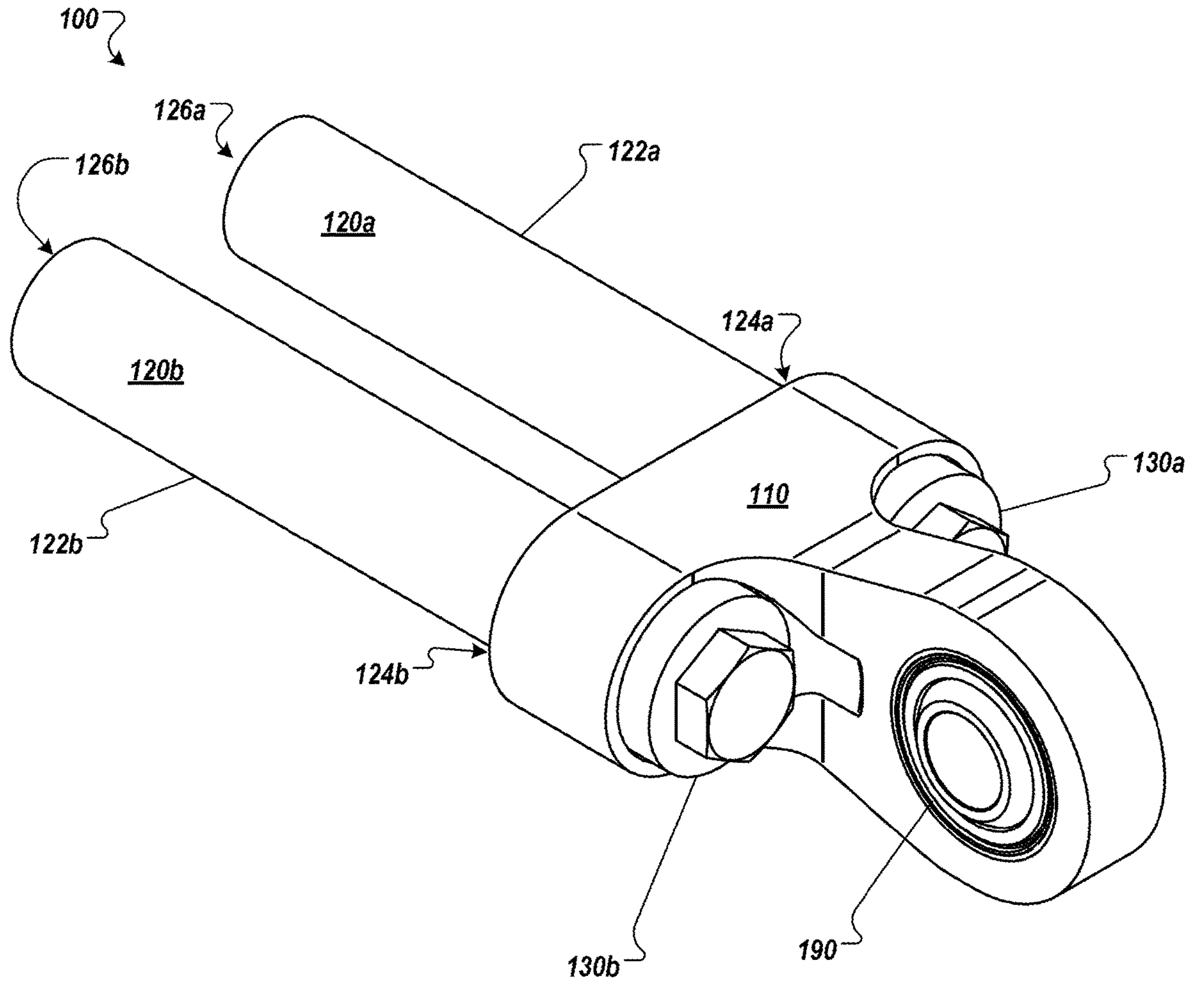
FIG. 1 is a perspective view of an example dual-parallel fluid actuator piston interface apparatus.
Figure 2:
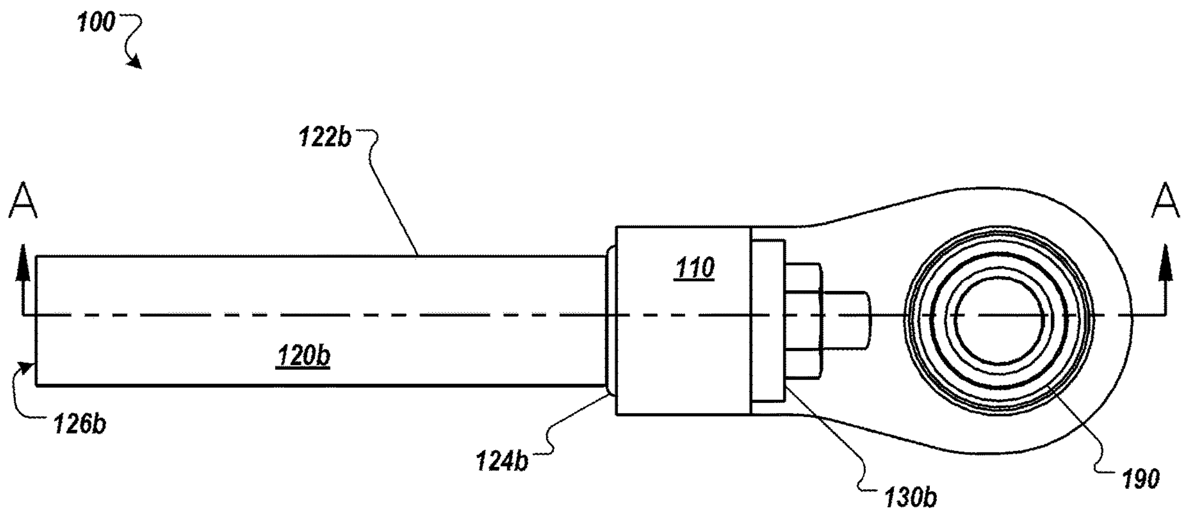
FIG. 2 is a side view of the example dual-parallel fluid actuator piston interface apparatus of FIG. 1.
Figure 3:
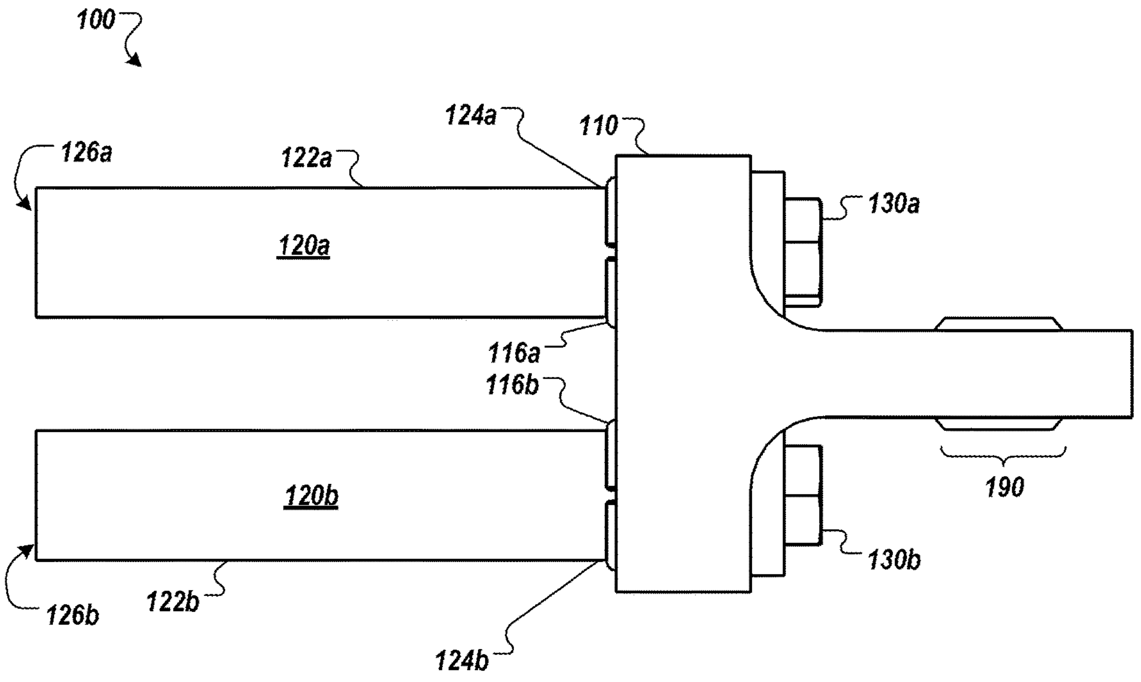
FIG. 3 is a top view of the example dual-parallel fluid actuator piston interface apparatus of FIGS. 1-2.
Figure 4:
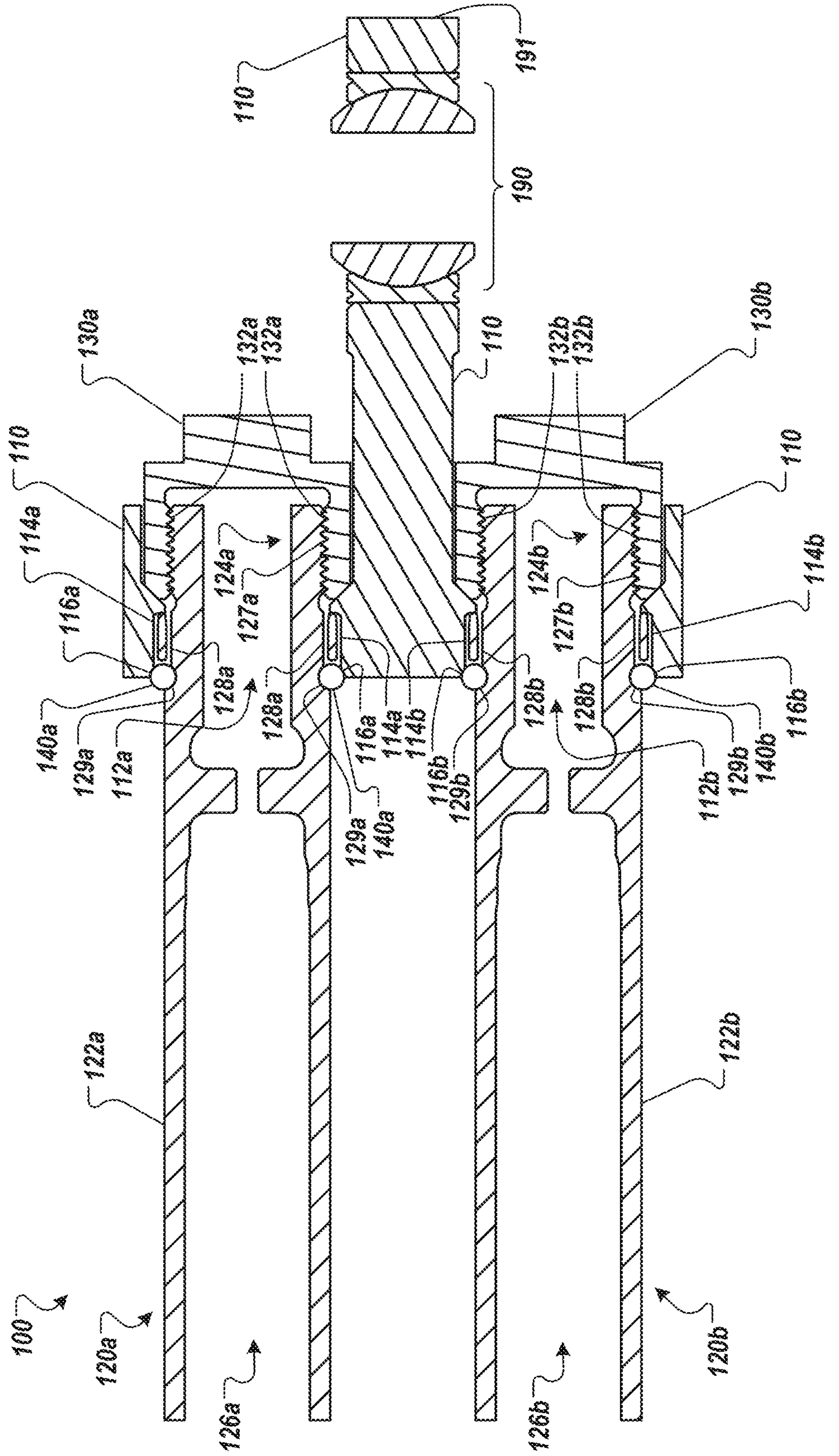
FIG. 4 is a sectional top view of the example dual-parallel fluid actuator piston interface apparatus of FIGS. 1-3.
Figure 5:
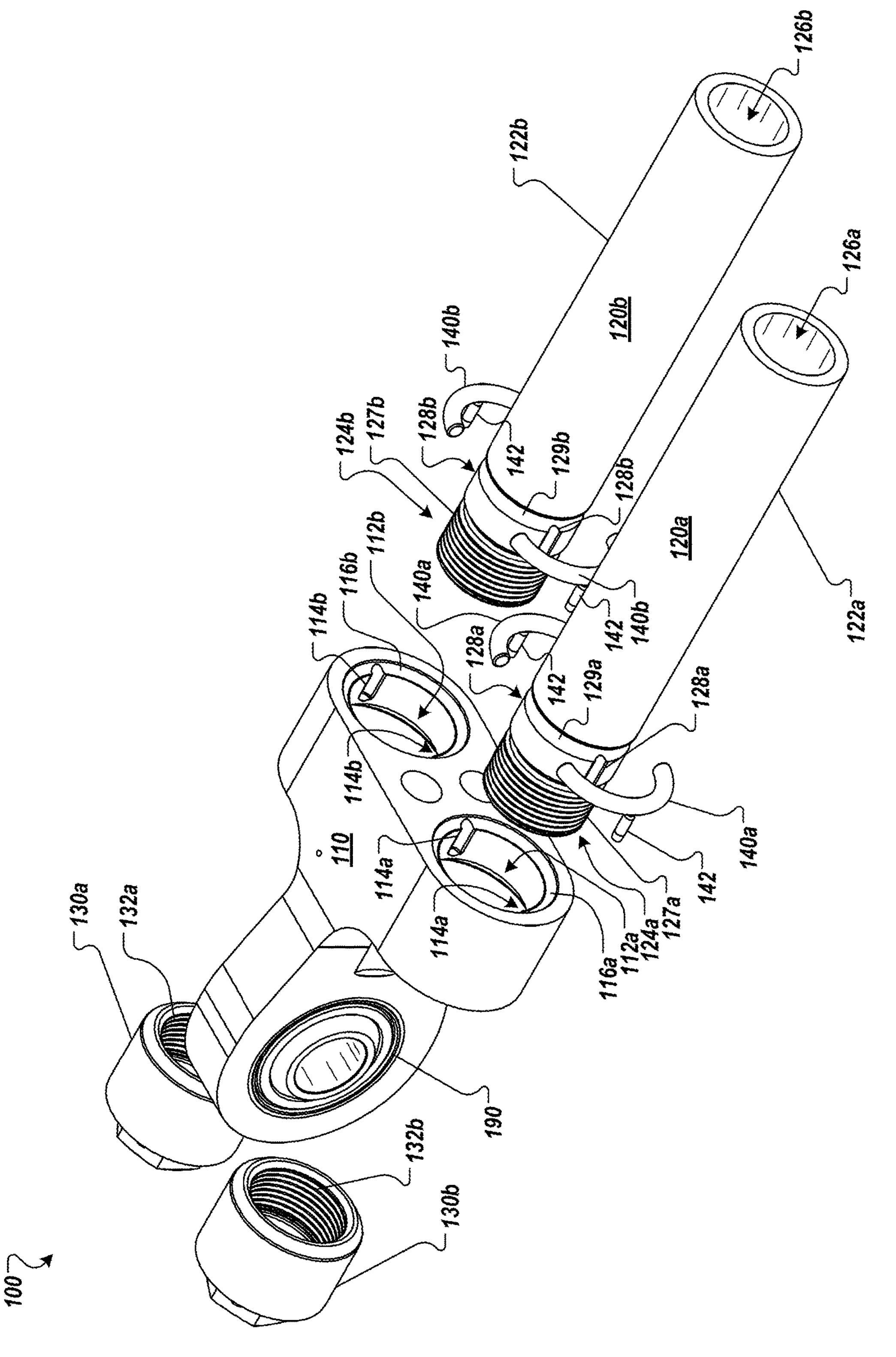
FIG. 5 is an exploded perspective view of the example dual-parallel fluid actuator piston interface apparatus of FIGS. 1-4.

FIGS. 1-4 show various views an example dual-parallel fluid actuator piston interface apparatus 100. FIG. 1 is a perspective view of the example dual-parallel fluid actuator piston interface apparatus 100. FIG. 2 is a side view of the example dual-parallel fluid actuator piston interface apparatus 100. FIG. 3 is a top view of the example dual-parallel fluid actuator piston interface apparatus 100. FIG. 4 is a sectional top view of the example dual-parallel fluid actuator piston interface apparatus 100 taken along section A-A of FIG. 2. FIG. 5 is an exploded perspective view of the example dual-parallel fluid actuator piston interface apparatus 100.

The apparatus 100 includes a rod end assembly 110, a piston assembly 120*a*, a piston assembly 120*b*, a retaining cap 130*a*, and a retaining cap 130*b*. The piston assembly 120*a* has a piston rod 122*a* that has a piston rod end 124*a* and defines a cavity 126*a*. The piston assembly 120*b* has a piston rod 122*b* that has a piston rod end 124*b* and defines a cavity 126*b*. The rod end assembly includes a distal end 191 and a mounting interface assembly 190 (e.g., a clevis assembly, bearing assembly) configured to be removably affixed to an external assembly.

The rod end assembly 110 defines an aperture 112*a* configured to receive the piston rod end 124*a*, and defines an aperture 112*b* configured to receive the piston rod end 124*b*. The rod end assembly 110 also defines a collection of recesses 114*a* that further define the aperture 112*a*, and a collection of recesses 114*b* that further define the aperture 112*b*.

An outer periphery of the piston rod end 124*a* includes a thread 127*a* defined upon the outer surface of the piston rod end 124*a*, and an outer periphery of the piston rod end 124*b* includes a thread 127*b* defined upon the outer surface of the piston rod end 124*b*. The piston rod end 124*a* also defines a collection of recesses 128*a* and 129*a*, and the piston rod end 124*b* also defines a collection of recesses 128*b* and 129*b*. The recesses 128*a* and 128*b* are semi-cylindrical (e.g., defining a half-cylinder shape) and aligned longitudinally relative to their respective piston rods 122*a* and 122*b*. The recesses 129*a* and 129*b* are semi-toroidal, circumferential recesses (e.g., defining a half-toroid shape) that circumscribe their respective piston rod ends 124*a* and 124*b*. A retaining clip 140*a* (shown as a split retaining ring in FIG. 5 for illustration purposes) is arranged within the recess 129*a*, coaxially about the outer periphery of the piston rod end 124*a*, and a retaining clip 140*b* (e.g., a toroidal ring, shown as a split ring in FIG. 5 for illustration purposes) is arranged within the recess 129*b*, coaxially about the outer periphery of the piston rod end 124*b*. The retaining clips 140*a*-140*b* are configured as collars that extend radially away from the outer surfaces of the piston rods 122*a*-122*b* proximal the piston rod ends 124*a*-124*b*.

During assembly of the piston assembly 120*a* to the rod end assembly 110, the piston rod end 124*a* is inserted into the aperture 112*a* to bring the retaining clip 140*a* into contact with a peripheral shoulder recess 116*a* defined at an end of the aperture 112*a*. The peripheral shoulder recess 116*a* is defined by the rod end assembly 110 as a semi-toroidal, concave recess configured to compliment the retaining clip 140*a*. The piston assembly 120*a* is rotated so the recesses 128*a* align with the recesses 114*a* to form a collection of cylindrically shaped, longitudinal recesses between the piston rod end 124*a* and the rod end assembly 110. A collection of anti-rotation keys 142 (e.g., pins) can be inserted into the aligned recesses 128*a* and 114*a* to prevent rotation of the piston assembly 120*a* relative to the rod end assembly 110.

During assembly of the piston assembly 120*b* to the rod end assembly 110, the piston rod end 124*b* is inserted into the aperture 112*b* to bring the retaining clip 140*b* into contact with a peripheral shoulder recess 116*b* defined at an end of the aperture 112*b*. The peripheral shoulder recess 116*b* is defined by the rod end assembly 110 as a semi-toroidal, concave recess configured to compliment the retaining clip 140*b*. The piston assembly 120*b* is rotated so the recesses 128*b* align with the recesses 114*b* to form a collection of cylindrically shaped, longitudinal recesses between the piston rod end 124*b* and the rod end assembly 110. Additional ones of the collection of anti-rotation keys 142 can be inserted into the aligned recesses 128*b* and 114*b* to prevent rotation of the piston assembly 120*b* relative to the rod end assembly 110.

The retaining cap 130*a* has a thread 132*a* defined upon its inner peripheral surface. The thread 132*a* is formed to be complimentary to the thread 127*a*. The retaining cap 130*b* has a thread 132*b* defined upon its inner peripheral surface.

The thread 132*b* is formed to be complimentary to the thread 127*b*. During assembly, the retaining cap 130*a* is threaded onto the piston rod end 124*a* within the aperture 112*a*, drawing the piston rod end 124*a* into the aperture 112*a*, and securely seating the retaining clip 140*a* between the recess 129*a* and the recess 116*a* and occluding the cavity 126*a*. During assembly, the retaining cap 130*b* is threaded onto the piston rod end 124*b* within the aperture 112*b*, drawing the piston rod end 124*b* into the aperture 112*b*, and securely seating the retaining clip 140*b* between the recess 129*b* and the recess 116*b* and occluding the cavity 126*b*.

In some embodiments, a linear variable transformer (LVDT) (not shown) can be arranged in one or each of the cavity 126*a* and/or the cavity 126*b*. Adjustment and calibration of the LVDTs can be done by removing the retaining caps 130*a*-130*b* to access the space and the LVDTs within the cavities 126*a*-126*b*.

In some embodiments, LVDT calibration can be affected by the relative position of the piston rod ends 124*a*-124*b* to the rod end assembly 110. For example, the piston rod end 124*a* may need to be fully seated during calibration of the LVDT. In some embodiments, assembly of the piston rod ends 124*a*-124*b* to the rod end assembly 110 can include the use of temporary caps in place of the retaining caps 130*a*-130*b* during initial assembly of the apparatus 100 and/or adjustment of LVDTs. The temporary caps can be threaded like the retaining caps 130*a*-130*b* but can be formed as open-ended cylinders that can retain the piston housing ends 124*a*-124*b* within the apertures 112*a*-112*b* while also providing access to the cavities 126*a*-126*b*. Once calibration/adjustment of the LVDTs is complete, the temporary caps can be removed and replaced with the retaining caps 130*a*-130*b*.

In some embodiments, the retaining caps 130*a*-130*b* can be formed as two-piece assemblies having an open-ended cylindrical section having the threads 132*a*-132*b* and a removable plug configured to be removably affixed to the cylindrical section to occlude one of the open ends. Assembly of the piston rod ends 124*a*-124*b* to the rod end assembly 110 can include the use of the cylindrical sections during initial assembly of the apparatus 100 and/or adjustment of LVDTs. Once calibration/adjustment of the LVDTs is complete, the plugs can be removably affixed to the cylindrical sections in order to occlude the cavities 126*a*-126*b*.

In operation, the piston assemblies 120*a* and/or 120*b* can experience stresses that can urge misalignment between the piston rod assemblies 120*a*-120*b* and the rod end assembly 110. For example, an asynchronicity between extension/retraction of the piston rod assemblies 120*a*-120*b* can create a torque at the piston rod ends 124*a*-124*b* between the piston rod assemblies 120*a*-120*b* and the rod end assembly 110. The example apparatus 100 accommodates such stresses by transferring non-axial forces from the piston rod 122*a*-122*b*, through the retaining clips 116*a*-116*b*, to the rod end assembly 110. As a result, minimal bending stresses are present at the threads 127*a* and 127*b* of the piston.

Figure 6:
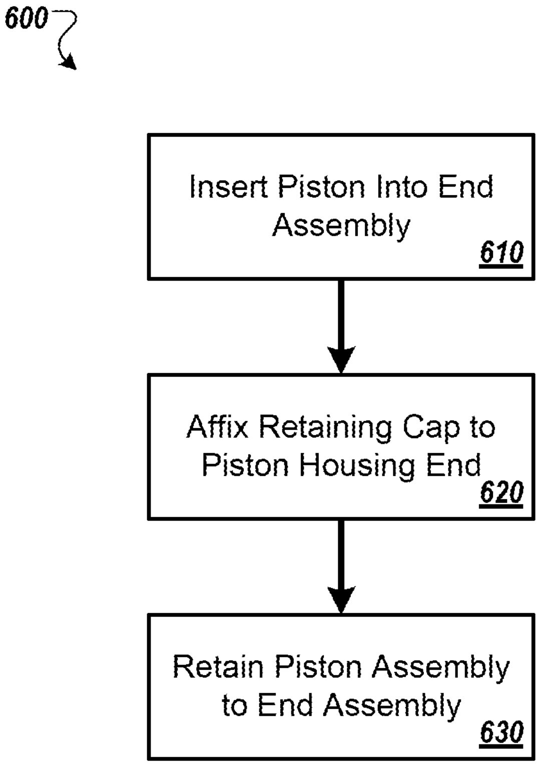
FIG. 6 is flow chart that shows an example of a process for assembling an example dual-parallel fluid actuator piston interface apparatus.

FIG. 6 is flow chart that shows an example of a process 600 for assembling an example dual-parallel fluid actuator apparatus. The processes may be performed, for example, to assemble an apparatus such as the example dual-parallel fluid actuator apparatus 100 of FIGS. 1-5. For clarity of presentation, the description that follows uses the dual-parallel fluid actuator apparatus as an example for describing the process 600. However, another apparatus, system, or combination of systems, may be used to perform the processes 600.

At 610, a first piston rod end of a first piston assembly is inserted into a first aperture defined in a rod end assembly. For example, the piston housing end 124*a* can be inserted into the aperture 112*a*.

In some implementations, inserting the first piston rod end of the first piston assembly into the first aperture defined in the end assembly can include inserting the first piston rod end of the first piston assembly through a second aperture arranged coaxially within the first aperture, where the end assembly includes a shoulder extending radially partly inward from an inner surface of the end assembly and partly defining the first aperture and partly defining the second aperture.

At 620, a first retaining cap assembly is removably affixed to the first piston rod end. In some implementations, removably affixing the first retaining cap assembly to the first piston rod end can include threading the first retaining cap assembly onto the first piston rod end, wherein the first piston rod end includes a first thread defined upon a first outer surface of the first piston assembly, and the first retaining cap assembly includes a second thread defined upon a first inner surface of the first retaining cap, where the first thread is configured to threadedly engage with the second thread. For example, the retaining cap 130*a* can be threaded onto the piston rod end 124*a*.

At 630, the first piston assembly is removably retained to the rod end assembly based on the affixing. For example, a portion of the rod end assembly 110 can be captured between the retaining cap 130*a* and the piston rod 122*a*.

In some implementations, the process 600 can include inserting a second piston rod end of a second piston assembly into a second aperture defined in the rod end assembly, wherein the second piston assembly is arranged substantially parallel to the first piston assembly, removably affixing a second retaining cap assembly to the second piston rod end, and removably retaining, by the affixing, the second piston assembly to the rod end assembly. For example, the piston rod end 124*b* can be inserted into the aperture 112*b*, the retaining cap 130*b* can be threaded onto the piston rod end 124*b*, and a portion of the rod end assembly 110 can be captured between the retaining cap 130*b* and the piston rod 122*b*.

In some implementations, the process 600 can include contacting an end face of the rod end assembly with a collar extending radially away from an outer surface of the first piston assembly proximal the first piston rod end. In some implementations, the collar can be a retaining clip, and the process 600 can include arranging the retaining clip at least partly within a recess defined in the outer surface. For example, the retaining clip 140*a* can be arranged within the peripheral shoulder recess 116*a* and become contactingly captured between the peripheral shoulder recess 116*a* and the end of the aperture 112*a*.

In some implementations, the process 600 can include inserting an anti-rotation key into a cavity partly defined by a longitudinal piston rod recess defined in an outer surface of the first piston assembly and a longitudinal end assembly recess defined in the first aperture. For example, the piston assembly 120*a* can be rotated so the recesses 128*a* align with the recesses 114*a* to form a collection of cylindrically-shaped, longitudinal recesses between the piston rod end 124*a* and the rod end assembly 110, and the collection of anti-rotation keys 142 can be inserted into the aligned recesses 128*a* and 114*a* to prevent rotation of the piston assembly 120*a* relative to the rod end assembly 110.

In some implementations, the process 600 can include removably affixing a plug to the first retaining cap assembly to occlude an opening defined though the first retaining cap assembly. For example, the retaining cap 130*a* can be formed as two-piece assemblies having an open-ended cylindrical section having the thread 132*a* and a removable plug configured to be removably affixed to the cylindrical sections in order to occlude the cavity 126.

In some implementations, the process 600 can include accessing a first longitudinal cavity defined in the first piston assembly and having a first opening at the first piston rod end. For example, an LVDT arranged within the cavity 126*a* can be accessed through the aperture 112*a* and the piston rod end 124*a*.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. An actuator apparatus comprising:
- a first piston assembly comprising a first piston rod defining a first longitudinal cavity having a first opening at a first piston rod end and a second opening at a second piston rod end longitudinally opposite the first piston rod end, wherein the first longitudinal cavity extends through the second opening;
- a second piston assembly arranged substantially parallel to the first piston assembly and comprising a second piston rod having a third piston rod end;
- an end assembly defining a first aperture configured to receive the first piston rod end, and a second aperture configured to receive the third piston rod end;
- a first retaining cap assembly configured to affix to the first piston rod end, abut the end assembly when affixed to the first piston rod end, and retain the first piston rod end within the first aperture; and
- a second retaining cap assembly configured to affix to the third piston rod end, abut the end assembly when affixed to the third piston rod end, and retain the third piston rod end within the second aperture.

2. The actuator apparatus of claim 1, wherein the end assembly comprises:
- a first shoulder extending radially partly inward from a first inner surface of the end assembly and partly defining an end of the first aperture and arranged coaxially within the first aperture.

3. The actuator apparatus of claim 1, further comprising a collar extending radially away from an outer surface of the first piston rod proximal the first piston rod end, and the end assembly comprises an end face configured to coaxially contact the collar.

4. The actuator apparatus of claim 3, further comprising a circumferential recess defined in the outer surface, and the collar comprises a retaining clip partly arranged within the circumferential recess.

5. The actuator apparatus of claim 1, wherein:
- the first piston rod end comprises a first thread defined upon a first outer surface of the first piston rod; and
- the first retaining cap assembly comprises a second thread defined upon a first inner surface of the first retaining cap assembly, wherein the first thread is configured to threadedly engage with the second thread.

6. The actuator apparatus of claim 1, further comprising:
- a longitudinal piston rod recess defined in an outer surface of the first piston rod;
- a longitudinal end assembly recess defined in the first aperture; and
- an anti-rotation key arranged at least partly within the longitudinal piston rod recess and at least partly within the longitudinal end assembly recess.

7. The actuator apparatus of claim 1, wherein the first retaining cap assembly defines an opening therethrough, and further comprises a removable plug arranged to occlude the opening.

8. The actuator apparatus of claim 1, wherein
- the second piston rod defines a second longitudinal cavity having a third opening at the third piston rod end and a fourth opening at a fourth piston rod end longitudinally opposite the third piston rod end.

9. The actuator apparatus of claim 1, wherein the end assembly further comprises a mounting assembly or a clevis assembly.

10. The actuator apparatus of claim 1, wherein the first retaining cap assembly encloses the first opening.

11. An actuator apparatus comprising:
- a piston assembly comprising a piston rod defining a longitudinal cavity having a first opening at a piston rod end and a second opening at a second piston rod end longitudinally opposite the piston rod end, wherein the longitudinal cavity extends through the second opening;
- an end assembly defining an aperture configured to receive the piston rod end; and
- a retaining cap assembly configured to affix to the piston rod end, abut the end assembly along a side surface of the retaining cap assembly when affixed to the piston rod end, and retain the piston rod end within the aperture such that at least a portion of the end assembly bears against the retaining cap assembly and against an outwardly-projecting shoulder of the piston rod, wherein the side surface is parallel to a longitudinal direction of the piston rod; wherein the retaining cap assembly comprises a cap end, and wherein the end assembly extends away from the piston rod end to a distal end disposed at a distance from the piston rod end that is greater than a distance between the distal end and the cap end.

12. The actuator apparatus of claim 11, further comprising one or more of:
- a shoulder extending radially partly inward from an inner surface of the end assembly and partly defining the aperture and partly defining a second aperture arranged coaxially within the aperture, wherein the piston rod end is arranged to partly extend through the second aperture; and
- a collar extending radially away from an outer surface of the piston rod proximal the piston rod end, and the end assembly comprises an end face configured to coaxially contact the collar.

13. The actuator apparatus of claim 11, wherein the retaining cap assembly encloses the first opening.

14. The actuator apparatus of claim 11, wherein the end assembly comprises a mounting interface at the distal end.

15. The actuator apparatus of claim 11, wherein the retaining cap resides, with the retaining cap affixed to the piston rod end, at least partially within a housing of the end assembly.

16. The actuator apparatus of claim 11, wherein the retaining cap is arranged to be releasably affixed to the piston rod end.

17. The actuator apparatus of claim 11, wherein the side surface is a circumferential surface.

18. An actuator apparatus comprising:

a first piston assembly comprising a first piston rod having a first piston rod end;

a second piston assembly arranged substantially parallel to the first piston assembly and comprising a second piston rod having a second piston rod end;

an end assembly defining a first aperture configured to receive the first piston rod end, and a second aperture configured to receive the second piston rod end;

a first retaining cap assembly configured to affix to the first piston rod end, abut the end assembly when affixed to the first piston rod end, and retain the first piston rod end within the first aperture;

a second retaining cap assembly configured to affix to the second piston rod end, abut the end assembly when affixed to the second piston rod end, and retain the second piston rod end within the second aperture a longitudinal piston rod recess defined in an outer surface of the first piston rod;

a longitudinal end assembly recess defined in the first aperture; and an anti-rotation key arranged at least partly within the longitudinal piston rod recess and at least partly within the longitudinal end assembly recess.

* * * * *